United States Patent Office 2,714,615
Patented Aug. 2, 1955

2,714,615

OXONAPHTHALENE CORTISONE INTERMEDIATES

Melvin S. Newman, Columbus, Ohio, and Sambasiva Swaminathan, Mylapore, India, assignors to The Ohio State University Research Foundation, Columbus, Ohio, a corporation of Ohio No Drawing. Application March 8, 1954,
Serial No. 414,886

19 Claims. (Cl. 260—586)

This application is in part a continuation of our copending application Serial No. 218,410, filed March 30, 1951, now abandoned.

The present invention relates to a novel process for the preparation of new organic compounds of the naphthalene series. Novel organic compounds within the scope of the present invention include 1,2,3,7,8,8α-hexahydro-6-alkoxy-8α - methyl - 1 - oxonaphthalene, and 8α - methyl-1,2,3,4,6,7,8,8α - octahydro - 1 - ethynyl - 1 - hydroxy - 6- oxonaphthalene.

The compounds of the present invention are important intermediates in the preparation of cortisone. The compounds of the present invention are also useful as plant growth regulators.

Thus an object of the present invention is to provide a novel process for the preparation of novel organic compounds of the naphthalene series. It is an additional object of the present invention to prepare novel organic compounds which are useful in the preparation of cortisone. Other objects of the present invention will be apparent to those skilled in the art to which the invention pertains.

The novel 1,2,3,7,8,8α - hexahydro - 6 - alkoxy - 8α- methyl-1-oxonaphthalenes produced by the process of the present invention can be used as a liquid vehicle in insecticidal and repellant compositions. Also it can be converted to 1 - hydroxy - 1 - cyano - 6 - alkoxy - 8α - methyl-1,2,3,7,8,8α - hexahydronaphthalene and the latter converted to cortisone according to the procedure described in our copending application Serial No. 319,505, filed November 8, 1952, now Patent No. 2,673,872, issued March 30, 1954. The novel 8α-methyl-1,2,3,4,6,7,8,8α-octahydro - 1 - ethynyl - 1 - hydroxy - 6 - oxonapthalene can be converted by refluxing in formic acid as more fully disclosed in our copending application Serial No. 267,097, filed January 18, 1952, now abandoned, to 1-acetyl-6-oxo-8α-methyl-3,4,6,7,8,8α-hexahydronaphthalene which, in turn, can be converted to cortisone as shown in the above application Serial No. 319,505 and according to the procedure disclosed by Friedmann et al. [Chem. and Ind., September 15, 1951, pages 777–778].

In the process of the present invention the novel 1,2,3,7,8,8α - hexahydro - 6 - alkoxy - 8α - methyl - 1- oxonaphthalene is produced by reacting 1-diethylamino-3-butanone with 2-methyl-1,3-cyclohexanedione in solution as, for example, in benzene with either pyridine or solid sodium hydroxide in catalytic quantities, to produce 8α-methyl - 1,6 - dioxo - 1,2,3,4,6,7,8,8α - octahydronapthalene having the formula:

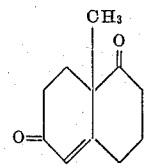

and reacting the thus-produced compound with trialkyl-orthoformate in the presence of a catalyst such as five percent alcoholic hydrochloric acid to produce 1,2,3,7,8,8α-hexahydro - 6 - alkoxy - 8α - methyl - 1 - oxonaphthalene having the formula:

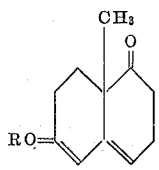

wherein R represents a lower-alkyl group such as, methyl, ethyl, propyl, butyl, amyl, etc. Reacting the above prepared 1,2,3,7,8,8α - hexahydro - 6 - alkoxy - 8α - methyl-1-oxonaphthalene with the alkali-metal salt of acetylene in a tertiary alcohol, and with sulfuric acid, results in the preparation of 8α - methyl - 1,2,3,4,6,7,8,8α - octahydro-1 - ethynyl - 1 - hydroxy - 6 - oxonaphthalene having the formula:

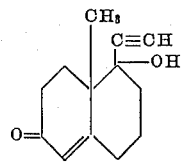

The following are examples of the practice of our invention:

Example 1.—Methyl-5-ketoheptanoate

The reaction was carried out in an atmosphere of nitrogen. Ethylmagnesium bromide was prepared from ethyl bromide (109 grams, 1 mole) and magnesium (24.5 grams, 1 g. atom) in anhydrous ether (500 moles). The solution was cooled in ice-cold water and to the stirred solution, anhydrous cadmium chloride (98 grams, 0.535 mole) was added during the course of 20 minutes while controlling the reflux. The reaction mixture was then allowed to stand at room temperature for 45 minutes with continued stirring. Ether was distilled rapidly from the stirred mixture by heating on a water bath until distillation slowed down and nearly dry residue remained. Dry benzene (500 moles) was added to the dark semisolid residue and the suspension well stirred. A solution of γ-carbomethoxybutyryl chloride (82.5 grams, 0.5 mole) in benzene (125 milliliters) was then added in portions controlling the reflux. The addition being completed, the reaction mixture was refluxed while being stirred for 30 minutes and then allowed to cool and stand overnight to complete the reaction. The mixture was afterwards decomposed with ice and 15 percent sulfuric acid. The benzene layer was separated and combined with an additional benzene (400 milliliters) extract of the aqueous layer. The combined extracts were washed successively with water, sodium bicarbonate solution (5 percent), water and saturated salt solution and then dried over anhydrous sodium sulfate. After removing the solvent under reduced pressure methyl 5-keto-heptanoate was obtained as a colorless oil, (61 grams or 74 percent), boiling point 96–97 degrees at eight millimeters $n_D^{20}$ 1.4325.

In yet another run that was made, the benzene solution of the acid chloride was added directly to the ether suspension of an ethylcadmium reagent and the reaction carried out in a benzene-ether mixture, other conditions remaining the same. The yield of product (boiling point 99–100 degrees at 9.5 millimeters $n_D^{20}$ 4.4318) was 67 percent.

Example 2.—2-methyl-1,3-cyclohexanedione

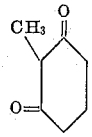

We prepared the above compound by cyclization of methyl 5-keto-heptanoate using sodium methoxide.

Example 3.—8α-methyl-1,6-dioxo-1,2,3,4,6,7,8,8α-octahydro-naphthalene

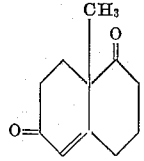

It was obtained by reacting 1-diethylamino-3-butanone with 2-methyl-1,3-cyclohexanedione in benzene solution either in the presence of pyridine or catalytic amounts of solid sodium hydroxide.

A mixture of 2-methyl-1,3-cyclohexanedione (12.6 grams) dry benzene (125 milliliters), 1-diethylamino-3-butanone (15.5 grams) and dry pyridine (8 milliliters) was refluxed together for 9 hours. An aqueous layer separated at the bottom of the reaction mixture as the reaction progressed, and five hours after the reflux was started this layer was distilled off with benzene (about 20 milliliters of distillate were collected). At the end of the reflux period, the reaction mixture was concentrated to half its volume by distillation at atmospheric pressure and the rest of the solvent and pyridine removed in vacuo under the water pump. The residual liquid which weighed 17 grams was distilled in vacuo in an atmosphere of nitrogen. The portion distilling at 121–124 degrees at 0.1 millimeters later solidified. This solid material was the diketone ($C_{11}H_{14}O_2$)

8α-methyl-1,6-dioxo-1,2,3,4,6,7,8,8α-octahydronaphthalene. It could be crystallized either from ether alone or ether-petroleum ether (boiling point 30–60 degrees) mixture. Melting point 47.5–48.5 degrees.

Analysis:
    Calculated for $C_{11}H_{14}O_2$_____ C, 74.1; H, 7.9
    Found _____ C, 74.3; H, 7.6

The distillate in the above experiment (boiling point 121–124 degrees at 0.1 millimeter) when treated with one mole of 2,4-dinitrophenylhydrazine in the usual manner furnished a deep red mono-dinitrophenylhydrazone. After three recrystallizations from alcohol alone or from pyridine-alcohol mixture, the derivative melted at 186–187 degrees.

Analysis:
    Calc. for $C_{17}H_{18}N_4O_5$___ C, 57.0; H, 5.1; N, 15.6
    Found _____ C, 56.7; H, 5.2; N, 16.0

The solid diketone ($C_{11}H_{14}O_2$—melting point 47.5–48.5 degrees) referred to above also furnished a 2,4-dinitrophenylhydrazone of melting point 186–187 degrees undepressed in melting point by the 2,4-dinitrophenylhydrazone previously described.

The diketone ($C_{11}H_{14}O_2$—melting point 47.5–48.5 degrees) furnished a dioxime when refluxed with pyridine and slightly more than two moles of hydroxylamine hydrochloride. After three recrystallizations from methanol, it melted at 200–200.5 degrees.

Analysis:
    Calc. for $C_{11}H_{16}O_2N_2$___ C, 63.4; H, 7.7; N, 13.5
    Found _____ C, 63.5; H, 7.6; N, 13.5

In the preparation of the diketone ($C_{11}H_{14}O_2$—melting point 47.5–48.5 degrees) we found that pyridine could be replaced by dry powdered solid sodium hydroxide (1 gram).

The reaction of the 2-methyl-1,3-cyclohexanedione with 1-diethylamino-3-butanone takes a different course under the conditions which have been usually employed for alkylations with 1-diethylamino-3-butanone of a cyclic ketone.

Example 4.—8α-methyl-1,6-dioxo-1,2,3,4,6,7,8,8α-octahydro-naphthalene

A mixture of 2-methyl-1,3-cyclohexanedione (25.2 grams), 1-diethylamino-3-butanone (34 grams), pyridine (17 milliliters) and dry benzene (260 milliliters) was refluxed on a steam-bath for fifteen hours. At the end of this period, benzene (75 milliliters) was distilled from the reaction mixture over a period of one-half to one hour. The reddish-brown benzene solution was then washed successively with hydrochloric acid (7.5 percent, 240 milliliters), water (two-200 milliliter portions) and finally saturated sodium chloride solution. The benzene layer was dried over anhydrous magnesium sulfate and concentrated on a steam-bath. The last traces of solvent were removed by distillation under reduced pressure. The residual liquid weighed 30 grams and was distilled in vacuo. The fraction distilling at 109–115 degrees at 0.05 millimeters weighed 20 grams and solidified on chilling in ice. The solidified product was crystallized from the minimum amount of ether to give a first crop of material weighing 13 grams (melting point 48–49 degrees). The filtrate from this crop of dilution with petroleum ether furnished more product (1.5–2.5 grams) of the same melting point.

In subsequent runs, the reaction product remaining after removal of benzene was seeded with a crystal obtained above and almost complete solidification occurred. The solid was then directly crystallized from ether to give 16–17 grams of product melting at 47–48 degrees. The filtrate from this crop was concentrated and the residual liquid (Ca 12 grams) distilled in vacuo. The fraction distilling at 109–115 degrees at 0.05 millimeters was collected and this, after solidification and crystallization, yielded 2–3 grams more of material. Melting point 47–48 degrees.

Example 5.—1,2,3,7,8,8α-hexahydro-6-ethoxy-8α-methyl-1-oxonaphthalene

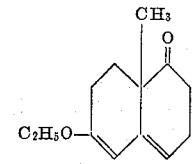

A mixture of 8α - methyl - 1,6 - dioxo - 1,2,3,4,6,7,8,8α-octahydronaphthalene (43.2 grams), absolute ethanol (36 milliliters), triethylorthoformate (41 grams), dry benzene (240 milliliters) and 5 percent alcoholic hydrochloric acid (8 milliliters) was refluxed for 2 hours on a water bath maintained at 75–80 degrees. The mixture was then cooled, neutralized with 10 percent alcoholic sodium hydroxide solution and taken up in ether (200 milliliters). The ether solution was successively washed with water (100 milliliters) 5 percent aqueous sodium hydroxide solution (300 milliliters), water (100 milliliters) and saturated sodium chloride solution and then dried over anhydrous sodium sulfate. The ether was then removed and the residual liquid which weighed 51–52 grams was distilled in vacuo and the orange-yellow liquid distilling at 101–104 degrees at 1 millimeter was collected. $n_D^{24}$ 1.5257.

A portion of the product obtained above was redistilled and the fraction distilling at 102 degrees at 0.7 millimeter was analyzed.

Analysis:
    Calculated for $C_{13}H_{18}O_2$_____ C, 75.7; H, 8.8
    Found _____ C, 75.2; H, 9.1

The oxime of the 1,2,3,7,8,8α-hexahydro-6-ethoxy-8α-methyl-1-oxonaphthalene was obtained by treatment with an aqueous-alcoholic mixture of sodium hydroxide and hydroxylamine hydrochloride. After two crystallizations from methanol, the derivative melted at 132.5–134 degrees.

Analysis:

Calc. for $C_{13}H_{19}NO_2$ _____ C, 70.6; H, 8.7; N, 6.3
    Found _____ C, 70.9; H, 8.4; H, 6.2

*Example 6.—1,2,3,7,8,8α-hexahydro-6-methoxy-8α-methyl-1-oxonaphthalene*

In the same manner as disclosed in Example 5, 1,2,3,7,8,8α - hexahydro - 6 - methoxy - 8α - methyl - 1 - oxonaphthalene is prepared utilizing trimethylorthoformate in place of triethylorthoformate of Example 5.

*Example 7.—1,2,3,7,8,8α-hexahydro-6-propoxy-8α-methyl-1-oxonaphthalene*

In the same manner as shown in Example 5, 1,2,3,7,8,8α - hexahydro - 6 - propoxy - 8α - methyl - 1 - oxonaphthalene is prepared utilizing tripropylorthoformate in lieu of triethylorthoformate of Example 5.

In essentially the same manner 1,2,3,7,8,8α-hexahydro-6 - butoxy - 8α - methyl - 1 - oxonaphthalene, 1,2,3,7,8,8α-hexahydro - 6 - amyloxy - 8α - methyl - 1 - oxonaphthalene, 1,2,3,7,8,8α - hexahydro - 6 - hexoxy - 8α - methyl-1-oxonaphthalene, and the like, are prepared by employing the corresponding trialkylorthoformate to react with 8α - methyl - 1,6 - dioxo - 1,2,3,4,6,7,8,8α - octahydronaphthalene.

*Example 8.—8α-methyl-1,2,3,4,6,7,8,8α-octahydro-1-ethynyl-1-hydroxy-6-oxonaphthalene*

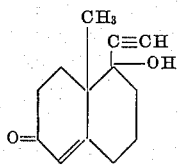

Purified and dried acetylene was bubbled through dry ether (175 milliliters) contained in a 3-neck flask provided with a mercury sealed stirrer and cooled in an ice-bath. At the end of ¾ hour, a mixture of a solution of potassium (2.5 grams) in dry t-amyl alcohol (36 milliliters) and dry ether (80 milliliters) was introduced dropwise over a period of another ¾ hour, with continued stirring and bubbling of acetylene. A solution of 1,2,3,7,8,8α-hexahydro - 6 - ethoxy - 8α - methyl - 1 - oxonaphthalene (7.05 grams) in dry ether (50 milliliters) was then added gradually over one-half hour and the reaction mixture allowed to stand for 7 hours. Dilute (10 percent) sulfuric acid (150 milliliters) was added and the reaction mixture stirred for 12 hours. The ether layer was separated, washed with water and saturated sodium chloride solution and dried over anhydrous magnesium sulfate. Ether was removed on a steam bath and the residual t-amyl alcohol solution chilled in ice. The crystals that separated were collected and recrystallized from ethanol to give product melting at 171.5–172.5 degrees. The filtrate from the initial crop, on concentration in vacuo in a stream of carbon dioxide yielded more of this product.

Analysis:

Calculated for $C_{13}H_{16}O_2$ _____ C, 76.4; H, 7.9
    Found _____ C, 76.4; H, 7.8
                                    76.3;    7.8

In the same manner as disclosed above, 8α - methyl-1,2,3,4,6,7,8,8α - octahydro - 1 - ethynyl - 1 - hydroxy - 6-oxonaphthalene is produced by reacting potassium acetylide in liquid ammonia with other 1,2,3,7,8,8α-hexahydro-6 - alkoxy - 8α - methyl - 1 - oxonaphthalenes, e. g., 1,2,3,-7,8,8α - hexahydro - 6 - methoxy - 8α - methyl - 1 - oxonaphthalene, 1,2,3,7,8,8α - hexahydro - 6 - propoxy - 8α-methyl - 1 - oxonaphthalene, 1,2,3,7,8,8α - hexahydro - 6-butoxy - 8α - methyl - 1 - oxonaphthalene, 1,2,3,7,8,8α-hexahydro - 6 - amyloxy - 8α - methyl - 1 - oxonaphthalene, and the like.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A new composition of matter consisting of a 1,2,3,-7,8,8α - hexahydro - 6 - alkoxy - 8α - methyl - 1 - oxonaphthalene having the structural formula:

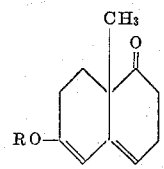

wherein R is a lower-alkyl group.

2. A new composition of matter consisting of an 8α-methyl - 1,2,3,4,6,7,8,8α - octahydro - 1 - ethynyl - 1-hydroxy - 6 - oxonaphthalene, having the structural formula:

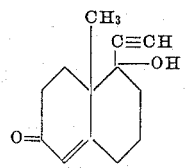

3. A new composition of matter consisting of a 1,2,3,7,-8,8α - hexahydro - 6 - ethoxy - 8α - methyl - 1 - oxonaphthalene, having the structural formula:

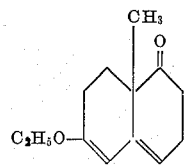

4. A new composition of matter consisting of a 1,2,3,7,-8,8α - hexahydro - 6 - propoxy - 8α - methyl - 1 - oxonaphthalene, having the structural formula:

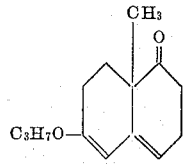

5. A new composition of matter consisting of a 1,2,3,7,-8,8α - hexahydro - 6 - methoxy - 8α - methyl - 1 - oxonaphthalene, having the structural formula:

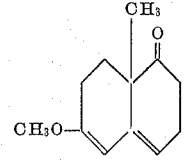

6. A process of forming an 8α - methyl - 1,6 - dioxo-1,2,3,4,6,7,8,8α - octahydronaphthalene which comprises mixing a 2 - methyl - 1,3 - cyclohexanedione in solution with 1 - diethylamino - 3 - butanone in the presence of a catalyst selected from the group consisting of pyridine and solid sodium hydroxide.

7. A process of forming an 8α-methyl-1,2,3,4,6,7,8,8α-octahydro-1-ethynyl-1-hydroxy-6-oxonaphthalene which comprises mixing a 2-methyl-1,3-cyclohexanedione in solution with 1-diethylamino-3-butanone in the presence of a catalyst selected from the group consisting of pyridine and solid sodium hydroxide, then reacting the 8α-methyl-1,6-dioxo-1,2,3,4,6,7,8,8α-octahydronaphthalene so produced with a triethylorthoformate, then reacting the product with the mono potassium salt of acetylene, and then subjecting the product to acid hydrolysis.

8. A process of forming an 8α-methyl-1,2,3,4,6,7,8,8α-octahydro-1-ethynyl-1-hydroxy-6-oxonaphthalene which comprises mixing sodium methoxide with methyl 5-ketoheptanoate to produce 2-methyl-1,3-cyclohexanedione; then mixing the 2-methyl-1,3-cyclohexanedione in solution with 1-diethylamino-3-butanone in the presence of a catalyst selected from the group consisting of pyridine and solid sodium hydroxide, then reacting the 8α-methyl-1,6-dioxo-1,2,3,4,6,7,8,8α-octahydronaphthalene so produced with a triethylorthoformate, then reacting the product with the mono potassium salt of acetylene, and then subjecting the product to acid hydrolysis.

9. A process of forming an 8α-methyl-1,6-dioxo-1,2,3,4,6,7,8,8α-octahydronaphthalene which comprises mixing a 2-methyl-1,3-cyclohexanedione in solution with 1-diethylamino-3-butanone in the presence of pyridine.

10. A process of forming an 8α-methyl-1,6-dioxo-1,2,3,4,6,7,8,8α-octahydronaphthalene which comprises mixing a 2-methyl-1,3-cyclohexanedione in solution with 1-diethylamino-3-butanone in the presence of solid sodium hydroxide.

11. A process of forming an 8α-methyl-1,2,3,4,6,7,8,8α-octahydro-1-ethynyl-1-hydroxy-6-oxonaphthalene which comprises mixing a 2-methyl-1,3-cyclohexanedione in solution with 1-diethylamino-3-butanone in the presence of a catalyst selected from the group consisting of pyridine and solid sodium hydroxide, then reacting the 8α-methyl-1,6-dioxo-1,2,3,4,6,7,8,8α-octahydronaphthalene so produced with a trialkylorthoformate, then reacting the product with the mono potassium salt of acetylene, and then subjecting the product to acid hydrolysis.

12. A process of forming an 8α-methyl-1,2,3,4,6,7,8,8α-octahydro-1-ethynyl-1-hydroxy-6-oxonaphthalene which comprises mixing a sodium alkoxide with methyl 5-ketoheptanoate to produce 2-methyl-1,3-cyclohexanedione; then mixing the 2-methyl-1,3-cyclohexanedione in solution with 1-diethylamino-3-butanone in the presence of a catalyst selected from the group consisting of pyridine and solid sodium hydroxide, then reacting the 8α-methyl-1,6-dioxo-1,2,3,4,6,7,8,8α-octahydronaphthalene so produced with a trialkylorthoformate, then reacting the product with the mono potassium salt of acetylene, and then subjecting the product to acid hydrolysis.

13. A process of forming an 8α-methyl-1,2,3,4,6,7,8,8α-octahydro-1-ethynyl-1-hydroxy-6-oxonaphthalene which comprises reacting an 8α-methyl-1,6-dioxo-1,2,3,4,6,7,8,8α-octahydronaphthalene with a triethylorthoformate, then reacting the product with the mono alkali salt of acetylene, and then subjecting the product to acid hydrolysis.

14. A process of forming an 8α-methyl-1,6-dioxo-1,2,3,4,6,7,8,8α-octahydronaphthalene which comprises mixing a sodium methoxide with methyl 5-ketoheptanoate to produce a 2-methyl-1,3-cyclohexanedione; then mixing this product in solution with 1-diethylamino-3-butanone in the presence of a catalyst selected from the group consisting of pyridine and solid sodium hydroxide.

15. A process of forming an 8α-methyl-1,6-dioxo-1,2,3,4,6,7,8,8α-octahydronaphthalene which comprises mixing an alkali alkoxide with methyl 5-ketoheptanoate to produce a 2-methyl-1,3-cyclohexanedione; then mixing this product in solution with 1-diethylamino-3-butanone in the presence of a catalyst selected from the group consisting of pyridine and solid sodium hydroxide.

16. A process of forming a 1,2,3,7,8,8α-hexahydro-6-alkoxy-8α-methyl-1-oxonaphthalene which comprises mixing sodium methoxide with methyl-5-ketoheptanoate to produce 2-methyl-1,3-cyclohexanedione; then mixing the 2-methyl-1,3-cyclohexanedione in solution with 1-diethylamino-3-butanone in the presence of the catalyst selected from the group consisting of pyridine and solid sodium hydroxide to form an 8α-methyl-1,6-dioxo-1,2,3,4,6,7,8,8α-octahydronaphthalene and then reacting the 8α-methyl-1,6-dioxo-1,2,3,4,6,7,8,8α-octahydronaphthalene so produced with a trialkylorthoformate to produce a 1,2,3,7,8,8α-hexahydro-6-alkoxy-8α-methyl-1-oxonaphthalene wherein the alkyl groups of the trialkylorthoformate and wherein the alkoxy group of the product have all lower alkyl and lower alkoxy groups respectively.

17. A process of forming an 8α-methyl-1,2,3,4,6,7,8,8α-octahydro-1-ethynyl-1-hydroxy-6-oxonaphthalene which comprises mixing an 8α-methyl-1,2,3,7,8,8α-hexahydro-6-ethoxy-1-oxonaphthalene with a monoalkali salt of acetylene and then subjecting the product to acid hydrolysis.

18. A process of forming an 8α-methyl-1,2,3,7,8,8α-hexahydro-6-ethoxy-1-oxonaphthalene which comprises mixing a sodium alkoxide with methyl 5-ketoheptanoate to produce 2-methyl-1,3-cyclohexanedione; then mixing the 2-methyl-1,3-cyclohexanedione in solution with 1-diethylamino-3-butanone in the presence of a catalyst selected from the group consisting of pyridine and solid sodium hydroxide; and then reacting the 8α-methyl-1,6-dioxo-1,2,3,4,6,7,8,8α-octahydronaphthalene so produced with triethylorthoformate.

19. A process of forming an 8α-methyl-1,2,3,7,8,8α-hexahydro-6-ethoxy-1-oxonaphthalene which comprises mixing a 2-methyl-1,3-cyclohexanedione in solution with 1-diethylamino-3-butanone in the presence of a catalyst selected from the group consisting of pyridine and solid sodium hydroxide; and then reacting the 8α-methyl-1,6-dioxo-1,2,3,4,6,7,8,8α-octahydronaphthalene so produced with triethylorthoformate.

No references cited.